United States Patent [19]

Burgdorf

[11] Patent Number: 5,288,142
[45] Date of Patent: Feb. 22, 1994

[54] HYDRAULIC BRAKE SYSTEM INCLUDING SLIP CONTROL

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 85,135

[22] Filed: Jun. 30, 1993

Related U.S. Application Data

[63] Continuation of Ser. No. 638,927, Jan. 9, 1991, abandoned.

[30] Foreign Application Priority Data

Jan. 13, 1990 [DE] Fed. Rep. of Germany ....... 4000837

[51] Int. Cl.$^5$ ............................................. B60T 13/16
[52] U.S. Cl. .................. 303/113.2; 303/116.2; 303/10
[58] Field of Search ............... 303/113.1, 113.2, 115.4, 303/116.1, 116.2, 10, 11, 116.4

[56] References Cited

U.S. PATENT DOCUMENTS

| | | | |
|---|---|---|---|
| 4,509,802 | 4/1985 | Solleder et al. | 303/57 X |
| 4,578,951 | 4/1986 | Belart et al. | 303/115 PP |
| 4,618,189 | 10/1986 | Nakanishi et al. | 303/115 PP |

FOREIGN PATENT DOCUMENTS

| | | |
|---|---|---|
| 376788 | 7/1990 | European Pat. Off. ...... 303/115 PP |
| 3137287 | 1/1984 | Fed. Rep. of Germany . |
| 3538330 | 4/1987 | Fed. Rep. of Germany . |
| 3540366 | 5/1987 | Fed. Rep. of Germany . |
| 3602430 | 7/1987 | Fed. Rep. of Germany . |
| 3717237 | 12/1988 | Fed. Rep. of Germany . |
| 3731636 | 4/1989 | Fed. Rep. of Germany . |
| 3831426 | 4/1989 | Fed. Rep. of Germany . |
| 3803363 | 8/1989 | Fed. Rep. of Germany . |
| 3839178 | 8/1989 | Fed. Rep. of Germany . |
| 3903532 | 8/1989 | Fed. Rep. of Germany . |
| 3906141 | 9/1989 | Fed. Rep. of Germany . |
| 3900851 | 1/1990 | Fed. Rep. of Germany . |
| 1160343 | 12/1986 | Japan . |
| 301157 | 12/1988 | Japan ............................ 303/116 R |
| 1-12964 | 1/1989 | Japan . |
| 1-301448 | 2/1990 | Japan . |
| 1544467 | 4/1979 | United Kingdom . |
| 2057613 | 7/1980 | United Kingdom . |
| 2224089 | 9/1989 | United Kingdom . |

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

A hydraulic brake system is described including a brake slip and/or traction slip control, wherein a pump required herefor is connected in series into the brake conduit through which, in a normal deceleration process, pressure fluid is displaced from the master brake cylinder to the wheel brake. The pump is mounted so that the intake side thereof is in communication with the master brake cylinder and the pressure side thereof is in communication with the wheel brake. Upon commencement of a slip control, the pump drive is turned on. As the master cylinder pressure prevails on the intake side of the pump the pump can very quickly reach the full discharge capacity, thereby enhancing control response of the slip. Moreover, the risk of air being sucked into the brake system is reduced.

16 Claims, 4 Drawing Sheets

HYDRAULIC BRAKE SYSTEM INCLUDING SLIP CONTROL

This is a continuation of application Ser. No. 07/638,927 filed on Jan. 9, 1991, now abandoned.

INTRODUCTION

The present invention is concerned with a hydraulic brake system of a type including a control for preventing brake slip and/or traction slip, the brake systems comprising a pedal-operated master cylinder, at least one wheel brake which, through a brake conduit is in communication the master cylinder, with pressure fluid, upon actuation of the pedal, being displaced from the master brake cylinder through the brake conduit into the wheel brake; the brake system of a type also having a hydraulic pump to allow controlled reincrease in pressure at the wheel cylinder.

BACKGROUND OF THE INVENTION

A brake system of the aforementioned type has been described, for example, in DE OS 38 31 426.

The pump has the function to deliver the pressure fluid discharged during a control from the wheel brakes back into the brake conduit. For that purpose, the intake side of the pump is in communication with a pressure fluid collector capable of being connected to the wheel brakes, while the pressure side of the pump is in communication with the master brake cylinder. The pump, hence, is connected in shunt with the brake conduit so that no pressure fluid flows therethrough during pedal operated braking.

A connection of the intake side to the master brake cylinder is established only during a traction slip control. In that case, the pump will suck off pressure fluid from the reservoir associated to the master brake cylinder, delivering the same to the wheel brake. However, this will occur only in the inoperative condition of the master brake cylinder, i.e., in a non-pressurized condition.

A circuit of the afore-described type involves two essential disadvantages. In brake slip control, the pump delivers from the non-pressurized pressure fluid collector against the pressure in the master cylinder with the consequence that especially with a cold and viscous brake fluid, the full power of the pump will be reached only after an extended start-up phase which, in turn, will result in a deteriorated control quality.

Another disadvantage resides in that the automatic suction pump forms vacuum if no adequate pressure fluid is available on the intake side thereof. Air is liable to flow into the vacuum if damage is done to the corresponding seals. It is difficult to remove such air from the brake system as the pump is in shunt with the brake conduit, with air voids in the brake system being likely to result in a failure of the brake system.

It is, therefore, the problem of the invention to provide a hydraulic brake system which irrespective of the ambient temperature, permanently insures a high control quality and exhibits a low failure probability, thus permitting a particularly easy ventilation.

BRIEF DESCRIPTION OF THE INVENTION

The problem underlying the invention is solved by connecting the pump in series in the brake circuit, with an intake connected to the master cylinder, and the pressure side connected to the wheel cylinders. As the pump is connected in series in the brake conduit, at the start-up of the pump, there is a pressure equilibrium on the intake and pressure sides thereof, thereby insuring, especially at low temperatures, a substantially enhanced pumping power. Unavoidable air pockets, will be removed from the pump during a deceleration process, thereby maintaining the efficiency thereof.

The device for modulating the brake pressure usually comprises inlet and outlet valves controlling the pressure fluid supply to each wheel brake. The valves are electromagnetically actuated; the control signals are generated by an electronic analyzer evaluating signals of wheel sensors determining the rotating pattern of the wheels.

A separating valve between the master cylinder and the intake side of the pump causes the master cylinder, during a brake slip control, to be decoupled from the brake circuit so that pressure fluctuations in the system do not involve any effect on the master cylinder.

A high-pressure accumulator on the pressure side of the pump takes up the pressure fluid delivered by the pump and forms the pressure generator in lieu of the master cylinder. In order to prevent the accumulator from taking up pressure fluid during a normal pedal operated deceleration process, the spring thereof is biased such that no pressure fluid is taken up by the accumulator at a pressure level below that resulting in the locking of the wheel.

A direct conduit including a check valve between the wheel brake and the master cylinder prevents the pressure in the wheel brake from being higher than the pressure in the master brake cylinder, thereby enabling the driver of the automotive vehicle to terminate a control deceleration when he decreases the pressure on the pedal. Also the pressure decrease during a non-controlled deceleration is through the direct conduit.

In order to enable a pressure to be built up in the wheel brake even with a non-actuated pedal as is required in a traction slip control, an electromagentically actuated valve is provided in the direct conduit which, during a traction slip control, blocks the direct conduit.

A release valve between the intake and pressure sides of the pump will prevent the pressure from excessively rising on the pressure side of the pump.

Preferably, the separating valve in the brake conduit also may be mechanically actuated; in that case, it would be advantages to mechanically couple separating valve and accumulator thereby causing the separating valve to be closed in a displacement of the accumulator piston.

The release valve also may be operative in the accumulator, for which purpose, the piston of the accumulator will be provide with a valve which, after a predetermined distance covered by the piston of the accumulator is pushed open against the force of the spring by means of a plunger. Pressure fluid in a chamber of the accumulator can flow off into the counter-pressure chamber which, through a connecting conduit, is in communication with the intake side of the pump. The energy requirements for loading the accumulator are thereby reduced. Equally, an additional amount of pressure fluid (corresponding to the volume of the counter-pressure chamber) can be brought to high-pressure level so that also in case of a failure of the pump during a control process, operation thereof may be continued.

A controllable throttle in the connection to the intake side and the pressure side of the pump, equally, may have a positive influence on the efficiency of the pump.

Another advantage offered by the system resides in that a boosting effect may be attained. For that purpose, the pump is to be controlled in proportion to the pedal force.

The principle of the invention, its development and its use will now be explained in closer detail with reference to the four drawing Figures.

The detailed description of the disclosed embodiments makes reference to the accompanying drawings.

DETAILED DESCRIPTION OF THE PREFERRED AND ALTERNATIVE EMBODIMENTS OF THE INVENTION

Figure 1:
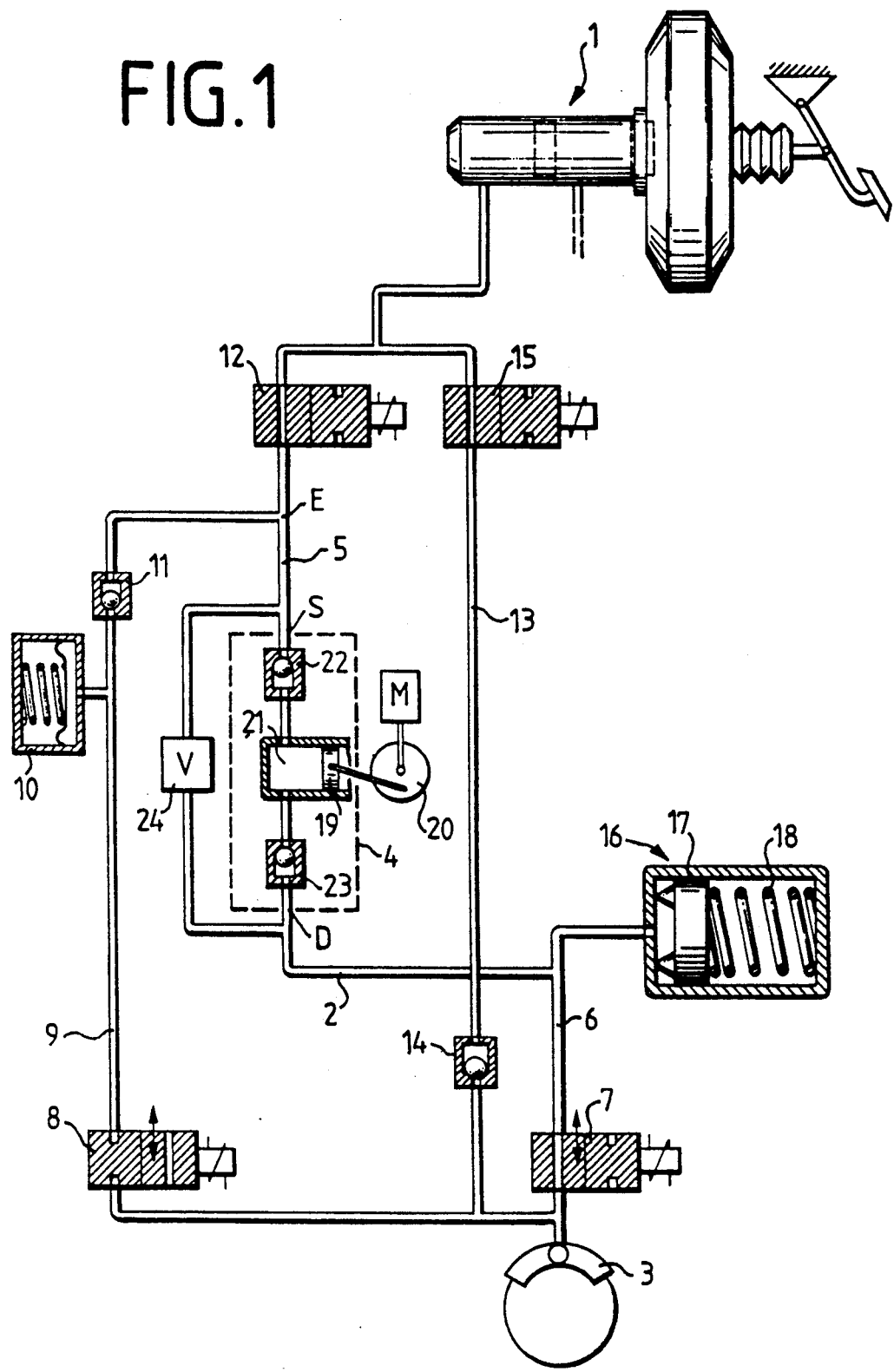
FIG. 1 shows schematically a hydraulic brake system including a device for brake slip and traction slip control employing the present invention.

Firstly, FIG. 1 will be described showing the basic principle of the invention. The brake system comprises a master brake cylinder 1 connected via a brake conduit 2 to one or a plurality of wheel brakes 3. Pump 4, to be described in closer detail hereinafter, is provided in the brake conduit, with the intake side S thereof, through a first brake conduit section 5, being in communication with the master brake cylinder 1, and with the pressure side D thereof, through a second brake conduit section 6, being in communication with the wheel brake. Provided in the second brake conduit section 6 is an inlet valve 7 which is electromagnetically actuated. In its basic position, it keeps open the conduit, blocking it in its switching position. The wheel brake 3, through a fluid collector 10, with an outlet valve 8 being provided in the return conduit 9; the outlet valve 8 also is electromagnetically actuated to be in a blocking state in the return conduit 9, and opening the same in its switching position. The pressure fluid collector 10 is a low-pressure accumulator of a restricted receiving capacity. It is in communication, through a check valve 11, with the first brake conduit section 5 (discharge point E). Provided between the discharge point E and the master brake cylinder 1 is a separating valve 12 which, in the form of embodiment of FIG. 1, is electromagnetically actuated and, in the basic position thereof, keeps open the brake conduit while, in the switching position, it blocks the brake conduit.

The wheel brake 3, through a direct conduit 13, is in direct communication with the master brake cylinder 1. The direct conduit 13 exhibits a check valve 14 opening toward the master brake cylinder. Moreover, provided in the direct conduit 13 connected in parallel to the brake conduit sections 5, 12, 16 is a blocking valve 15 which, in view of the function thereof, will be referred to hereinafter as the ASR-valve.

In the basic position thereof, valve 15 keeps the direct conduit 13 open while in its switching position taken by it during a traction slip control, it blocks the direct conduit 13. The pressure side D of the pump 4 is connected to a high-pressure accumulator 16 which in this form of embodiment is a piston-type accumulator. The piston 17 of the accumulator is so loaded by a strong spring 18 that the accumulator chamber is of a minimum volume. The spring-type accumulator 18 is prestressed so that a minimum pressure must be available on the pressure side D of the pump to cause the accumulator to take up volume.

The pump 4 according to this form of embodiment is in the form of a piston-type pump, the pump piston 19 of which is moved through a power-driven eccentric 20. The pump chamber 21 ahead of the pump piston 19 is connected to respective check valves 22 and 23, on the intake side S and the pressure side D respectively. The check valve 22 opens toward the pump chamber 21 while the check valve 23 opens away from the pump chamber 21. A release valve 24 connects the pressure side D of the pump 4 to the intake side S, preventing overload on the pressure accumulator 16 from occurring.

The operation of the brake system as shown is as follows:

1. Pedal Operated Braking

Through actuation of the pedal (schematically shown), pressure fluid is displaced from the master brake cylinder 1 into the wheel brake 3. The pressure path leads through the open separating valve 12, the first check valve 22, the pump chamber 21, the second check valve 23 and the open inlet valve 7. A pressure is built up in the wheel brake 3 resulting in a wheel deceleration and, consequently, in a deceleration of the automotive vehicle. Once the pedal is released, pressure fluid will flow from the wheel brake 3 via the opening check valve 14 through the direct conduit 13 and the open ASR valve 15 back into the master brake cylinder. It is a feature of the invention that the pressure build-up path during a normal deceleration leads through the pump chamber 21.

2. Brake Slip Control

The braking pattern of the wheel to be decelerated is permanently monitored by means of sensors (not shown). Accordingly, an electronic analyzer is able to detect without delay the onset of a wheel tending to lock. Upon occurrence thereof, the analyzer will initiate the following steps: First, inlet valve 7 is switched to thereby block the brake conduit 6. Outlet valve 8 is opened to thereby enable pressure fluid to flow off from the wheel brake into the low-pressure accumulator 10. Valve 12 is closed causing the master brake cylinder 1 to be decoupled from the brake circuit. The pump drive M is switched on thereby enabling the pump 4 to deliver pressure fluid from the low-pressure accumulator 10 into the high-pressure accumulator 16. Piston 17 moves against the force of the spring 18 causing a pressure on the output of the pump D to correspond to the force of the spring. Through successive switching of the inlet valve 7 and of the outlet valve 8, pressure fluid can be supplied from the high pressure accumulator 16 to the wheel brake 3 and discharged from the into the low pressure accumulator 10 wheel brake 3 via the outlet valve 8. This is in accordance with a fixed algorithm thereby enabling an optimum slip value to be adjusted on the wheel. Through the direct line 13, the pressure in the brake wheel 3 is limited to the pressure in the master brake cylinder. Once the driver reduces the pedal force, the pressure in the wheel brake 3 will, accordingly, decrease, thereby terminating the decelerating or control process respectively.

3. Traction Slip Control

In the case of a driven wheel, it may happen that the torques transmitted by the engine of the automotive vehicle exceed the torques that can be transmitted between tire and roadway, resulting in wheelspin which can be prevented by a brake operation so that the driving torque compensated to such an extent that by a brake torque that the remaining torque exerts without slip forces that can be transmitted between tire and roadway. The afore-mentioned sensors also are able to detect a racing tendency. The electronic analyzer initiates the following steps: The pump motor 20 is turned on, causing the pump 4 to deliver pressure fluid from the reservoir associated with the master brake cylinder 1 through the master brake cylinder 1 and the open separating valve 12 to the wheel brake 3. The ASR-valve 15 is closed so that the pressure fluid delivered to the wheel brakes is unable to flow back, through the direct conduit 13 into the master brake cylinder 1. As in a brake slip control, now an optimum brake pressure can be adjusted in the wheel brake through switching of the valves 7 and 8. If a brake system is to have this option, the pump 4 must be of the self-sucking priming type as in the event of a traction slip control, there is no static pressure on the intake side of the pump. The release valve 24 prevents an excessive pressure from being built up on the pressure side of the pump.

Figure 2:
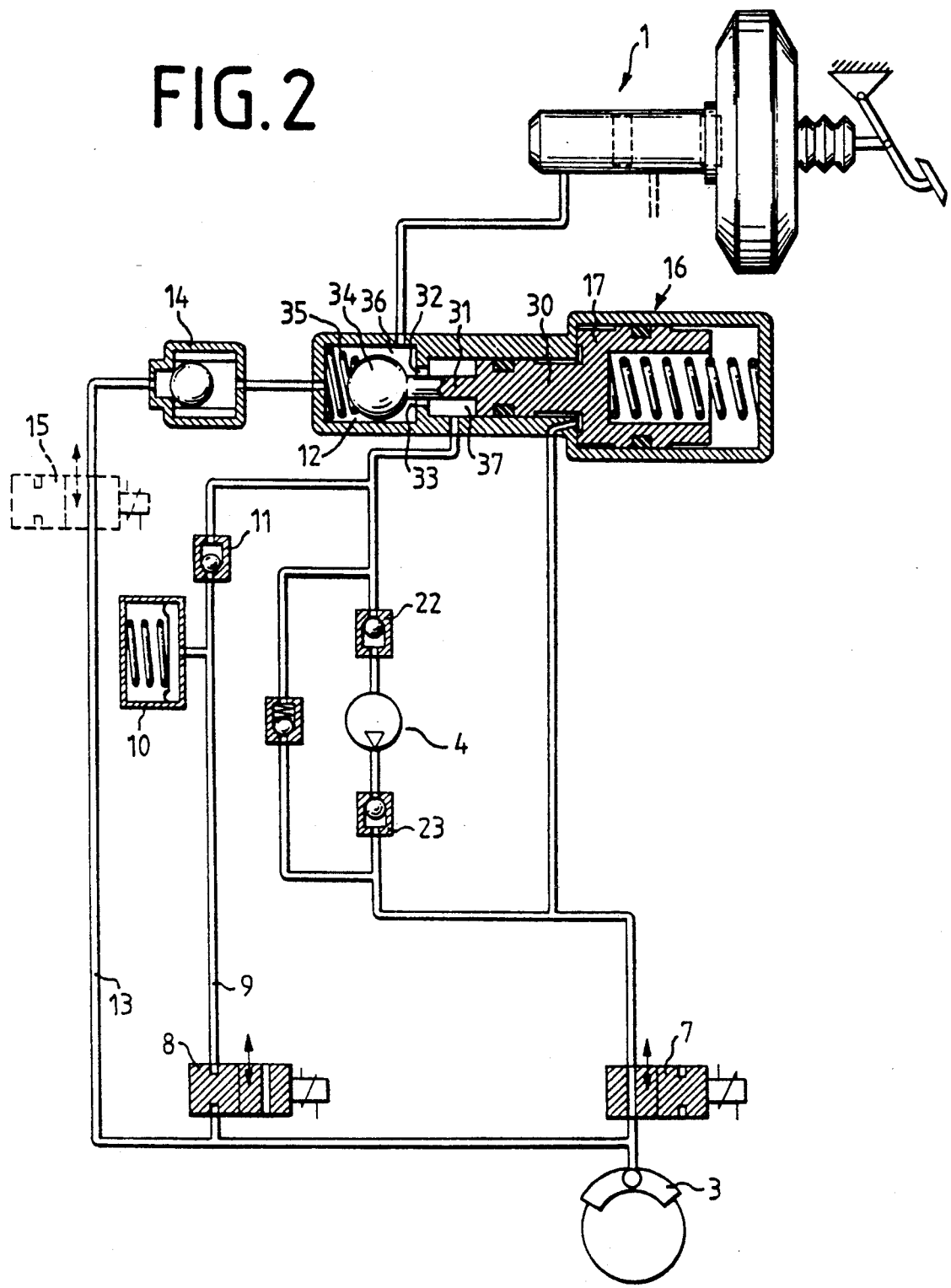
FIG. 2 shows schematically an alternative embodiment of the invention.

The embodiment according to FIG. 2 essentially corresponds to the one of FIG. 1. As opposed to FIG. 1, the separating valve 12' is not actuated electromagnetically but rather mechanically in dependence upon the filling level of the high-pressure accumulator 16'.

For that purpose, accumulator 16' and separating valve 12' are located in a common housing. The piston 17', on its end facing the accumulator chamber, has fixed an extension 30 of a smaller diameter than the accumulator piston 17'. The extension 30 is sealingly guided within a bore and, on the end thereof, facing away from the accumulator piston 17', has fixed a plunger 31 passing through a bore 32. The bore 32 connects to an inlet chamber 36 to an outlet chamber 37, with the inlet chamber 36 being in communication with the master brake cylinder and the outlet chamber 37 being in communication with the pressure side of the pump 4'. The outlet chamber 37 is confined by the front side of the extension 30. The separating valve 12' comprises a valve ball 34 in the inlet chamber 36 and a valve seat 33 on the bore 32. A valve spring 35 forces the valve ball toward the valve seat 33. Once the valve piston 17' is in its basic position, i.e., in a position in which the accumulator chamber is at its minimum volume, plunger 31 is passed through the bore 32, maintaining the valve ball 34 in spaced relationship from the valve seat 33.

There is a free pressure fluid passage from the master brake cylinder 1 to the pump 4. During a brake slip or traction slip control, the accumulator 16 is filled—as was explained earlier—causing the accumulator piston 17 according to the illustration in the depict. to move to the right as soon as there is adequate pressure on the pressure side of the pump 4. The plunger 31 is withdrawn from the bore 32 causing the valve ball 36 to be seated on the valve seat 33: The brake conduit 6 is blocked. The rest of the operation of the brake system corresponds to that of the brake system according to FIG. 1.

Figure 3:
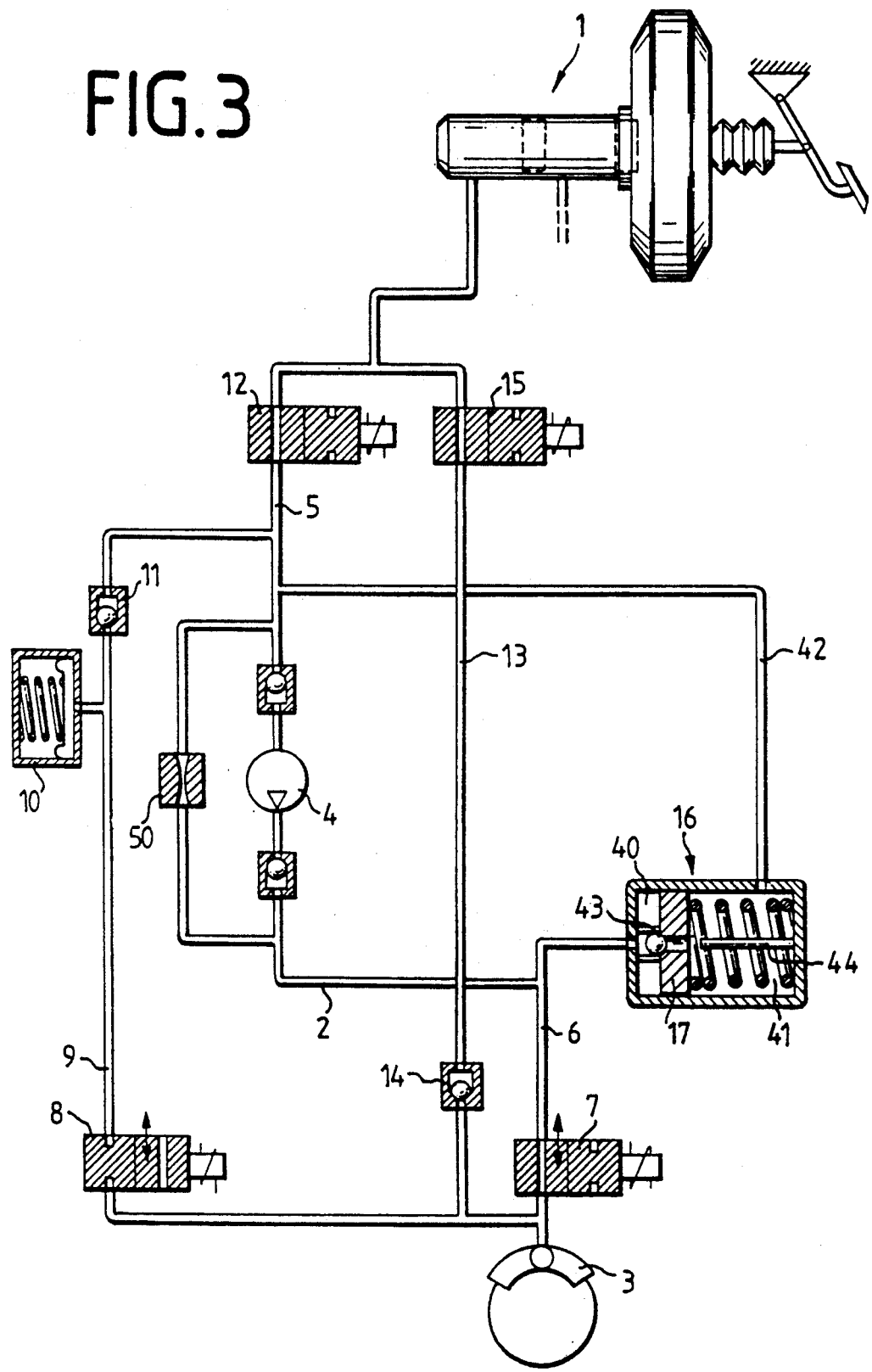
FIG. 3 shows schematically a second alternative embodiment of the invention.

FIG. 3 shows another embodiment of the brake system according to FIG. 1, it being essential that the pump overpressure release is performed by a valve within the accumulator 16''.

For that purpose, the accumulator piston 17'' contains a valve 43. The accumulator piston 17'' separates the chamber 40 from the counter-pressure chamber 41. The valve 43 comprises a connecting bore provided in the piston 17 between the two chambers 40 and 41. A valve body is located within the accumulator chamber 40 and is mountable onto the connecting bore. Once the accumulator piston is displaced to the right, as shown, a plunger 44, moves into the bore, lifting the valve ball of the valve 43 off the bore so that a pressure fluid communication is established between the storage chamber 40 and the counter-pressure chamber 41. The counter-pressure chamber 41, through a connecting conduit 42, is in communication with the intake side of the pump. Once a predetermined filling level of the accumulator, and, hence, a predetermined pressure within the storage chamber corresponding to the compression of the spring 18 has been attained, the valve 43 opens so that pressure fluid additionally admitted to the storage chamber, through the counter-pressure 41, flows back to the intake side of the pump. The remainder of the design and function of the brake system corresponds to the brake system of FIG. 1.

Figure 4:
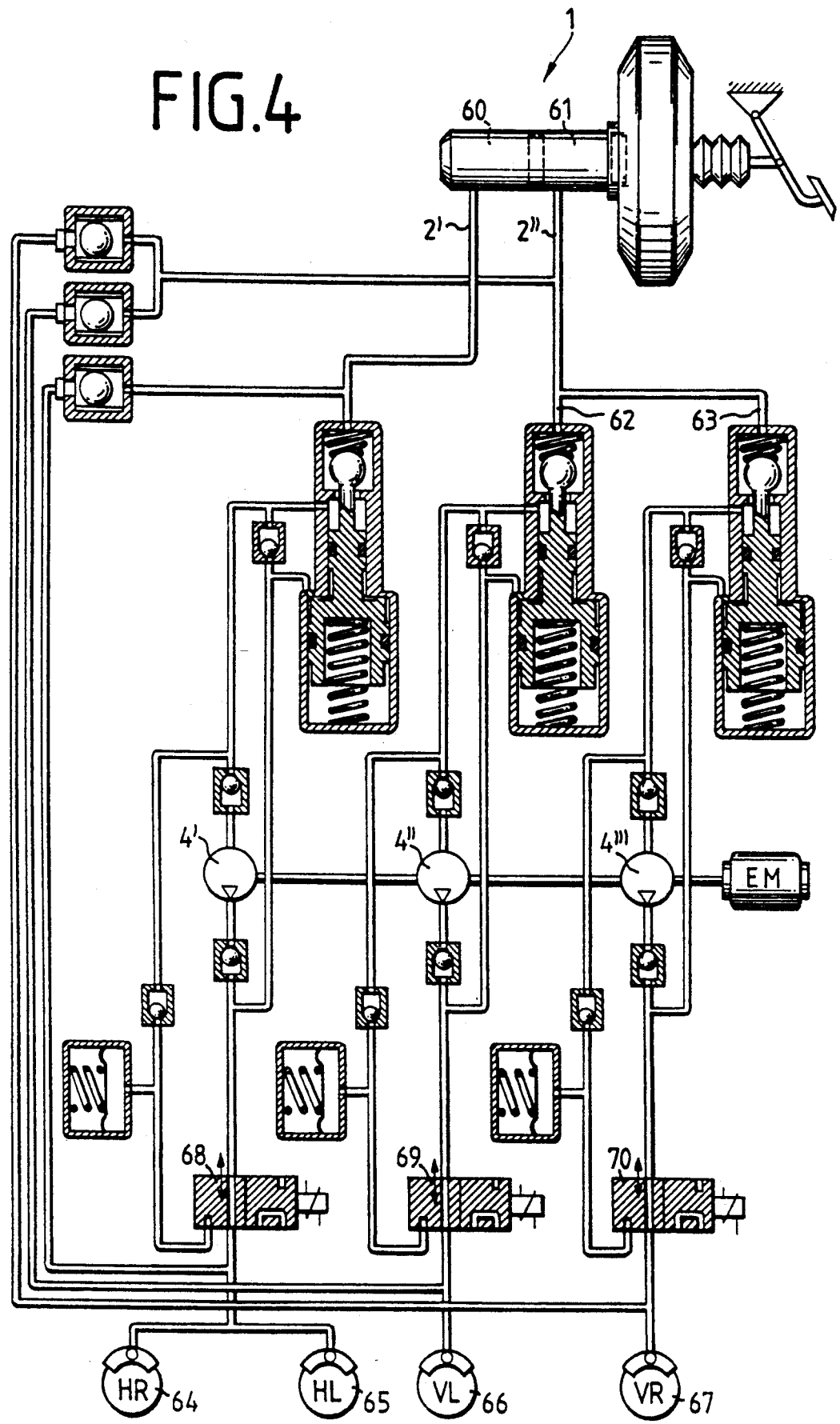
FIG. 4 shows schematically a third alternative embodiment of the invention.

FIG. 4 shows a complete brake system for a four-wheel automotive vehicle having wheels 64, 65, 66, 67 with the HR, HL, VL and VR codings of the following meaning:

HR=rear side to the right
HL=rear side to the left
VL=front side to the left
VR=front side to the right The master cylinder 1''' comprises two chambers 60, 61 each of them forming one brake circuit. Connected to the chamber 60, through brake conduits 2', are the wheel brakes of the wheels HR and HL. The brake pressure in the two wheel brakes is commonly controlled by a control system of the type as shown in FIG. 2. The brakes of the wheels VL and VR, through respectively one branch conduit 62, 63 of the brake conduit 2'', are in communication with the chamber 61 of the master brake cylinder. Each of the branch conduits 62, 63 exhibits a control system of the type as shown in FIG. 2.

The brake system, hence, exhibits three control circuits each of them having a pump 4', 4'', 4'''. It should be noted in this connection that the control system also can orient itself by FIGS. 1 and 3, respectively.

Special emphasis is given to the fact that the pumps 4', 4'', 4''', are actuated by a common drive, i.e., electro-motor EM. Another special feature resides in that the respective inlet and outlet valves are in the form of a 3-way/2-position valve 68, 69, 70. This results in a simplified system but involves the disadvantage that no pressure maintaining phase in which both the brake conduit and the return conduit are blocked, can be realized.

Each of the control systems operates on the previously described principle, it being, of course, possible for the pressure in the wheel brakes of each control circuit to be independently adjusted.

What is claimed is:

1. A hydraulic slip controlling brake system for controlling slip of an automotive vehicle wheel, comprising: a brake pedal; a brake pedal-actuated master cylinder associated with said vehicle wheel; at least one wheel brake cylinder; fluid circuit means placing said wheel brake cylinder in fluid communication with said master cylinder including a brake conduit means and pressure fluid therein whereby upon actuation of said brake pedal, pressure fluid is displaced from said master cylinder, along said brake conduit, and into said wheel brake cylinder to pressurize said wheel brake cylinder; antislip control means activated upon detection of a wheel slip condition to control pressurization of said wheel brake cylinder to control slip of said vehicle wheel, said antislip control means including a hydraulic pump connected in series in said fluid circuit means with said brake conduit means, said pump having a pump chamber and including an intake side communicating said pump chamber with said master cylinder and a pressure side communicating said pump chamber with said wheel brake cylinder, a flow path from said master cylinder to said wheel brake cylinder passing through said pump chamber during normal pressurization of said wheel brake cylinder by said brake pedal actuation without activation of said antislip control means so that said fluid circuit means causes displacement of pressure fluid through said pump chamber during brake pedal actuation which pressure fluid displacement corresponds to substantially the entire fluid pressure displacement from said master cylinder caused by actuation of said brake pedal in pressurizing of said wheel brake cylinder during normal brake operation without activation of said antislip control means.

2. A brake system according to claim 1, further including an inlet valve interposed in said brake conduit means, said inlet valve normally open, but in a switching position thereof, blocking said brake conduit means, a return conduit connecting said wheel brake cylinder to said pump intake side, a pressure fluid collector connected in said return conduit, an outlet valve in said return conduit acting to block said return conduit and, having a switching position which opens said return conduit.

3. A brake system according to claim 2, wherein said pressure fluid collector is in communication with said brake conduit means at a point between said pump intake side and said master cylinder by means including a check valve, and further including a separating valve in said brake conduit means interposed between said point and said master cylinder, said separating valve having a basic open position, and, having a switching position which blocks said brake conduit means upstream of said point.

4. A brake system according to claim 3, further including a high-pressure accumulator connected to said pressure side of said pump.

5. A brake system according to claim 4, wherein said high pressure accumulator includes means preventing charging until after a predetermined minimum pressure is developed on said pressure side of said pump.

6. A brake system according to claim 5, wherein said high pressure accumulator includes an accumulator chamber, a counterpressure chamber, and a separating piston separating said accumulator chamber from said counter-pressure chamber, a valve located in said separating piston, a plunger actuating said valve at a predetermined charge level in said accumulator chamber to establish communication between said accumulator chamber and said counter-pressure chamber at said predetermined charge level.

7. A brake system according to claim 6, wherein said counter-pressure chamber is in communication with said intake side of said pump.

8. A brake system according to claim 4, further including means mechanically operating said separating valve by charging of said high-pressure accumulator.

9. A brake system according to claim 8, wherein said high pressure accumulator includes a piston, and wherein said separating valve has a valve seat and a valve body, said accumulator piston having a plunger affixed thereto, said plunger engaging said valve body to move said valve body off said valve seat.

10. A brake system according to claim 2, wherein said pump is a positive displacement type, and wherein said brake system further includes a direct conduit connected in parallel to said brake conduit means and establishes direct communication between said wheel brake cylinder and said master cylinder, a check valve in said direct conduit and opening toward said master cylinder.

11. A brake system according to claim 10 further including a blocking valve in said direct conduit having a basic position, in which said direct conduit is open, and having a switching position blocking said direct conduit, said antislip control means activating said blocking valve upon detection of a traction slip condition of said vehicle wheel.

12. A brake system according to claim 10 wherein said pump is of a reciprocating piston type, said pump chamber intake side and said pressure side having respective first and second check valves connected thereto in said brake conduit means on either side of said pump chamber, said first check valve opening towards said pump chamber and interposed between said master cylinder and said pump chamber; said second check valve opening away from said pump chamber and interposed between said wheel brake cylinder and said pump chamber.

13. A brake system according to claim 2, wherein said inlet valve and said outlet valve are combined as a 3-way/2-position valve.

14. A brake system according to claim 1, further including release valve means connecting said intake side and pressure side of said pump upon development of a predetermined pressure difference.

15. A brake system according to claim 1, further including a controllable throttle interposed between said intake side and said pressure side of said pump.

16. A brake system according to claim 1, wherein a triple-circuit system is provided for a four-wheel automotive vehicle having a pair of rear wheel brake cylinders operated by one circuit and two front wheel brake cylinders each operated by a respective one of the other brake circuits and a pump for each of said control circuits, each of said pumps having a common drive.

* * * * *